US007178845B1

(12) United States Patent
Metzger et al.

(10) Patent No.: US 7,178,845 B1
(45) Date of Patent: Feb. 20, 2007

(54) ARTICLE GRASPING DEVICE

(76) Inventors: Paul Metzger, 1209 N. Kings Rd., #8, West Hollywood, CA (US) 90069; Jeff Metzger, 1209 N. Kings Rd., #8, West Hollywood, CA (US) 90069

( * ) Notice: Subject to any disclaimer, the term of this patent is extended or adjusted under 35 U.S.C. 154(b) by 0 days.

(21) Appl. No.: 11/217,732

(22) Filed: Aug. 31, 2005

(51) Int. Cl.
*B65G 7/12* (2006.01)

(52) U.S. Cl. ........................................ 294/26; 294/169

(58) Field of Classification Search ................. 294/1.1, 294/26, 137, 169; 16/413, 422; 4/246.1; 30/159; 7/118, 161
See application file for complete search history.

(56) References Cited

U.S. PATENT DOCUMENTS 2,461,941 A * 2/1949 Sutton ......................... 294/26
2,600,510 A * 6/1952 Lisignoli ..................... 294/26
2,799,527 A * 7/1957 Cederblad ..................... 294/26
3,197,097 A * 7/1965 Casuer et al. ............... 223/113
4,364,592 A * 12/1982 Jackson ....................... 294/26
5,375,295 A * 12/1994 Woodward ................... 16/412
5,540,468 A * 7/1996 Fassman ..................... 294/1.1
5,619,758 A * 4/1997 Burkett ....................... 4/246.1

* cited by examiner

*Primary Examiner*—Dean J. Kramer
(74) *Attorney, Agent, or Firm*—James E. Brunton, Esq.

(57) ABSTRACT

A compact, readily portable handheld article grasping apparatus for grasping articles such as door handles, gate handles, mailbox handles and the like. The apparatus includes a retractable gripping arm having a hook-like extremity for grasping objects. The gripping arm can be stowed when the article is being transported and quickly and easily deployed when the apparatus is to be used. When the article grasping arm is in a stowed configuration, the apparatus can be conveniently carried in the users pocket or purse.

15 Claims, 3 Drawing Sheets

44
56
62
34
58
54
50
52
46a
64
16a
46
6A
7A
8A
32
26
24
30

ARTICLE GRASPING DEVICE

BACKGROUND OF THE INVENTION

1. Field of the Invention

The present invention relates generally to handheld mechanical devices. More particularly, the invention concerns a novel, handheld article grasping device that can be used to grasp articles having contaminated surfaces such as door handles and the like.

2. Discussion of the Prior Art

Research has established that various types of harmful bacteria can survive for long periods of time on the surfaces of articles such as door handles; gate handles; mailbox handles; toilet flush handles; paper towel dispenser handles; sink faucet handles; handles on trash receptacle lids and like surfaces which are continuously contacted and contaminated by large numbers of people. Surfaces, such as surfaces on door handles, particularly those located in public buildings, are infrequently cleaned thereby permitting a substantial build up on the surfaces of easily spread, harmful bacteria. Transfer of the harmful bacteria from the hand of the user to the nose and mouth or eyes can cause serious illness. Similarly, if one has a cut or abrasion on the hand that contacts the door handle through which the harmful bacteria can penetrate, serious repercussions can follow. It is this serious cross-contamination problem that the present invention seeks to mitigate by providing an easy to use, easy to transport, handheld apparatus that can be used to grip and operate articles having highly contaminated surfaces.

SUMMARY OF THE INVENTION

It is an object of the invention to provide a compact, readily portable handheld article grasping apparatus for grasping articles such as door handles, gate handles, mailbox handles and the like.

Another object of the invention is to provide an apparatus of the aforementioned character which includes a retractable gripping arm that can be stowed when the article is being transported and quickly and easily deployed when the apparatus is to be used.

Another object of the invention is to provide an apparatus as described in the preceding paragraphs, which is uniquely configured so that when the article grasping arm is in a stowed configuration, the apparatus can be conveniently carried in the users pocket or purse.

Another object of the invention is to provide an apparatus of the character described in which the article grasping arm can be quickly and conveniently moved from a stowed configuration into a deployed configuration by simply pressing upon a spring-loaded operating button that is mounted in the cover of the apparatus.

Another object to the invention is to provide an apparatus as described in the preceding paragraphs in which the article grasping arm of the apparatus is specially configured to provide a hook-like extremity that can be used to easily and securely grip and operate various types of articles including door handles and the like.

Another object the invention is to provide a compact handheld, article grasping apparatus that is sleek and attractive in appearance and one that can be securely gripped by the user.

Another object to the invention is to provide an apparatus as described in the preceding paragraphs which is of a simple, easy-to-use construction and one that can be inexpensively manufactured in quantity.

DESCRIPTION OF THE INVENTION

Figure 1:
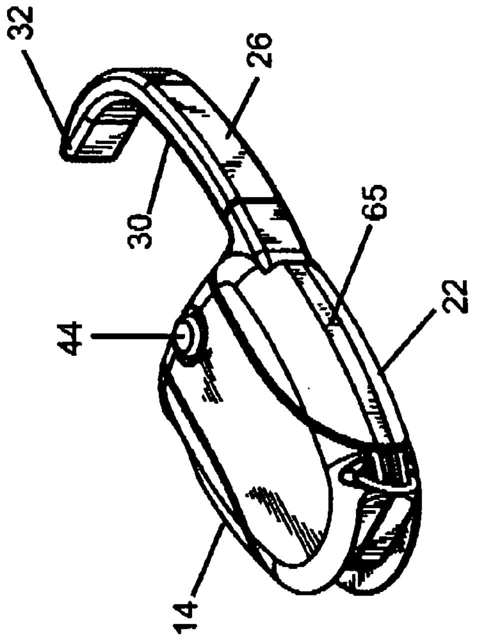
FIG. 1 is a generally perspective view of one form of the article grasping apparatus of the invention.
Figure 3:
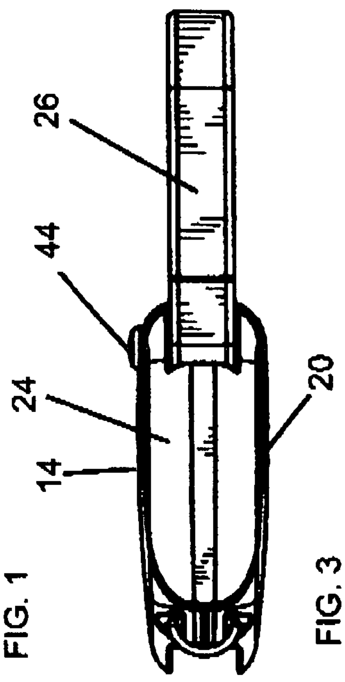
FIG. 3 is a rear view of the apparatus of the invention shown in FIG. 1.
Figure 2:
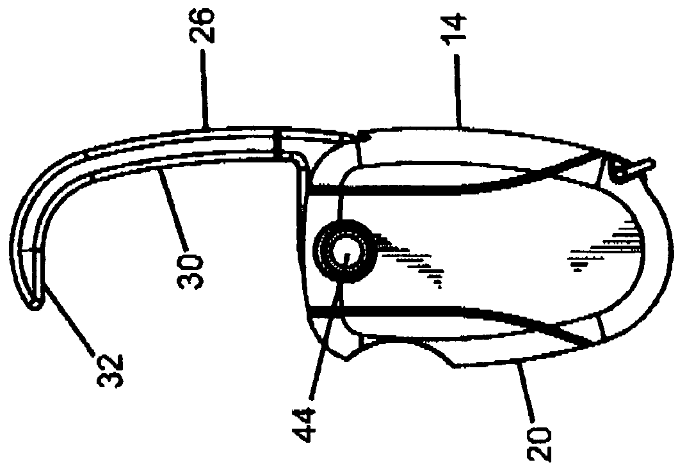
FIG. 2 is a top plan view of the apparatus shown in FIG. 1.
Figure 4:
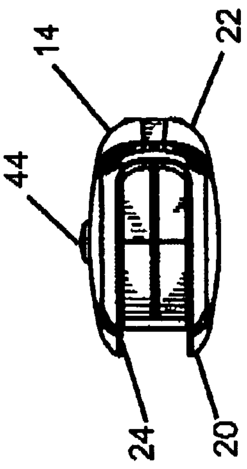
FIG. 4 is a right-hand view of the apparatus shown in FIG. 1.
Figure 5:
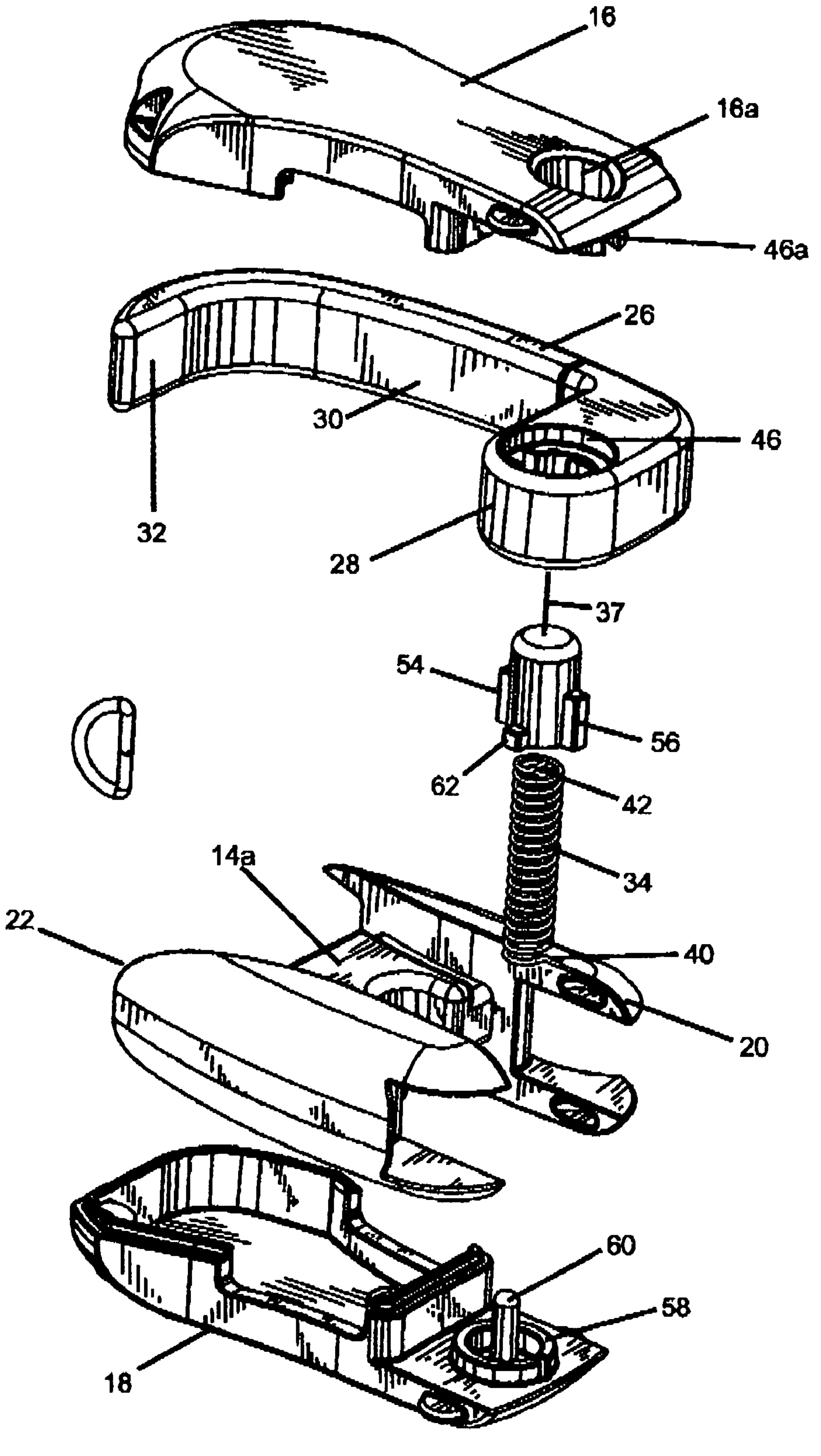
FIG. 5 is a generally perspective, exploded view of the apparatus shown in FIG. 1.
Figures 6, 6A, 7, 7A, 8, 8A:
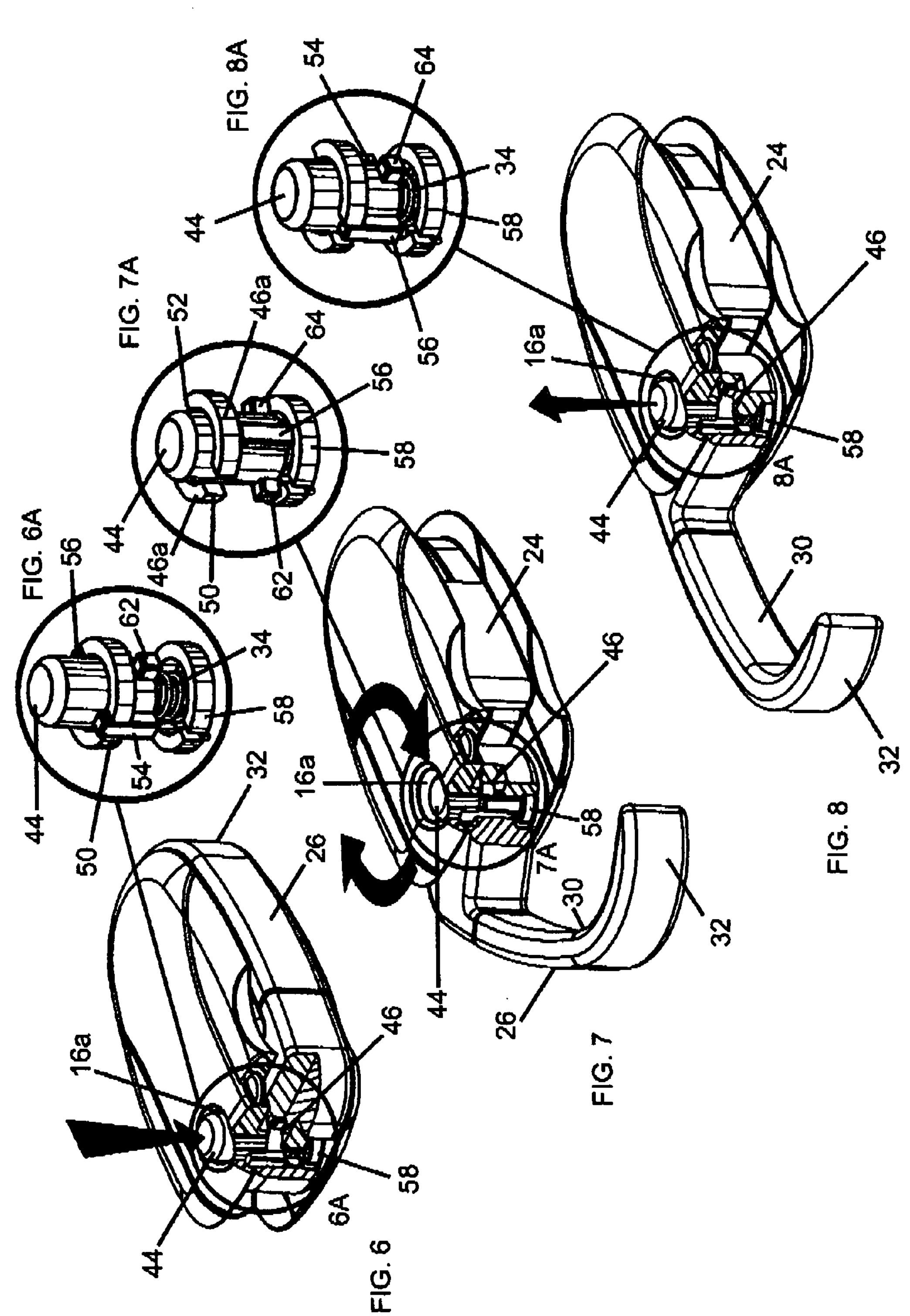
FIG. 6 is a generally perspective, diagrammatic view of the apparatus as appears when the grasping arm of the apparatus is in a stowed configuration.
FIG. 6A is a greatly enlarged, generally perspective view of the area designated in FIG. 6 as 6A.
FIG. 7 is a generally perspective, diagrammatic view of the apparatus as it appears when the grasping arm of the apparatus is partially deployed.
FIG. 7A is a greatly enlarged, generally perspective view of the area designated in FIG. 7 as 7A.
FIG. 8 as a generally perspective, diagrammatic view of the apparatus as it appears when the grasping arm of the apparatus is fully deployed.
FIG. 8A is a greatly enlarged, generally perspective view of the area designated in FIG. 8 as 8A.

Referring to the drawings and particularly to FIGS. 1 through 5, one form of the article grasping apparatus of the present invention for grasping objects such as door handles and the like comprises a housing 14 having spaced-apart top and bottom structures 16 and 18 respectively and first and second side structures 20 and 22 respectively, which cooperate to define an internal chamber 14*a* (FIG. 5). As best seen in FIGS. 3, 7 and 8, first side structure 20 includes an elongated chamber 24, the purpose of which will presently be described.

Connected to housing 14 for movement between a first stowed position shown in FIG. 6 and a second deployed position shown in FIG. 8 is a uniquely configured grasping member 26. As illustrated in FIG. 5 of the drawings, grasping member 26 includes an end or hub portion 28 disposed within internal chamber 14*a* and an interconnected arm portion 30 that is receivable within elongated chamber 24 of the first side structure when grasping member is in the stowed configuration shown in FIG. 6. As indicated in the drawings, arm portion 30 terminates in a generally hook-shaped extremity 32.

Deployment means, the character of which will presently be described, is carried by housing 14 and functions to move the grasping member 26 from its stowed position to its deployed position. In the present form of the invention, this important deployment means comprises a torsion spring 34 (FIG. 5) that is carried by housing 14 in the manner indicated in FIG. 5 of the drawings. Torsion spring 34, which is of conventional construction, has a longitudinal axis 37, a first end 40 that is connected to bottom structure 18 and a second end 42 that is connected to a pushbutton 44 that forms a part of the operating means of the invention. The torsion spring 34 is constructed and arranged to turn second end 42 about longitudinal axis 37, while first end 40 is held fast by the bottom structure 18 of the housing 14.

The important operating means of the invention, which is carried by housing 14, functions to operate the deployment means of the invention in a manner to cause grasping member 26 to move from its stowed position to its deployed position. In the present form of the invention, the operating means comprises the previously identified pushbutton 44 to which the upper end 42 of the torsion spring 34 is connected. As indicated in FIGS. 6, 7 and 8 of the drawings, pushbutton 44 is slidably received within a central bore 46 formed in the end portion 28 of the grasping member 26 for movement against the urging of torsion spring 34 between a first position shown in FIG. 6A and a second position shown in FIGS. 7 and 7A.

As best seen in FIG. 7A, the central bore 46 of the end portion 28 includes a pair of semicircular-shaped, inwardly extending ring-like segments 46*a* that cooperate to define a pair of oppositely disposed grooves 50 and 52. As indicated in FIGS. 5 and 6A, pushbutton 44 is provided with opposing, outwardly extending tongues 54 and 56 that are selectively, slidably received within opposing groves 50 and 52. More particularly, when the grasping member 26 is in its stowed position (FIG. 6) and when pushbutton 44 is in its upstanding position (FIG. 6A), tongue 54 is received within groove 50. However, when the grasping member is in its deployed position (FIG. 8), tongue 56 is received within groove 50 and tongue 54 is received within groove 52 thereby locking the grasping member in its deployed position.

Turning to FIG. 5, it is to be noted that bottom structure 18 of the housing includes an upstanding rim portion 58 and an upstanding spring locating member 60 over which the lower portion of torsion spring 34 is received. As best seen in FIGS. 5 and 7A, pushbutton 44 further includes a pair of opposing stop ears 62 and 64 which are constructed and arranged to engage the rim portion 58 of the bottom wall structure when pushbutton 44 is in the second, depressed position shown in FIG. 7A. Stop ears 62 and 64 function to control the downward movement of pushbutton 44 once the pushbutton is depressed in the manner shown in FIGS. 7 and 7A.

When the apparatus of the invention is not in use, the grasping member 26 is in the stowed position shown in FIG. 6 and the stop button 44 extends upwardly through an opening 16*a* formed in top or cover structure 16. When the apparatus is in the configuration shown in FIG. 6 of the drawings, it is quite compact and can be easily carried in the users pocket or purse. When it becomes necessary to open the door, or to grasp some other contaminated object, the grasping member 26 can be easily deployed by simply pushing down on pushbutton 44 against the urging of torsion spring 34 in the manner indicated by the arrow in FIG. 6. As the pushbutton is moved into the position shown in FIGS. 7 and 7A, tongue 54 will clear groove 50 permitting the preloaded torsion spring 34, which is connected to the pushbutton, to rotate the grasping member initially into the position shown in FIG. 7 of the drawings and then into the fully deployed position shown in FIG. 8. Once the stop ears 62 and 64 are in engagement with upstanding rim portion 58, the user can release the downward forces exerted on the pushbutton thereby permitting the torsion spring to move the pushbutton upwardly into the position shown in FIGS. 8 and 8A. As the pushbutton moves toward its starting position, tongue 54 will move into groove 52 thereby locking the gripping member 26 in its deployed, extended position as shown in FIG. 8. In the present form of the invention, tongue 54, along with groove 52 comprises the locking means of the invention for releasably locking the gripping member 26 in its deployed position.

When the apparatus user has finished using the apparatus a downward force exerted on the pushbutton will permit the grasping member 26 to be manually returned to its stowed position against the urging of torsion spring 34. This movement of the grasping member into its stowed position will once again reload the torsion spring so that the deployment operation can be accomplished in the manner described in the preceding paragraph.

In order for the apparatus to be securely gripped by the user during operation, side structure 22 is provided with a longitudinally extending, yieldably deformable elastomer strip 65 (Figure one).

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A grasping apparatus for grasping objects comprising:

(a) a housing comprising interconnected top, bottom and sides cooperating to define an internal chamber;

(b) a grasping member connected to said housing for movement between a first stowed position and a second deployed position, said grasping member comprising an end portion and an arm portion having a generally hook-shaped extremity, said end portion having a central bore;

(c) deployment means carried by said housing for moving said grasping member from said stowed position to said deployed position, said deployment means comprising a torsion spring carried by said housing, said torsion spring having a longitudinal axis and being operably associated with said grasping member; and (d) operating means carried by said housing for operating said deployment means to cause said grasping member to move from said stowed position to said deployed position, said operating means comprising a push button received within said central bore of said end portion of said arm for movement between a first and a second position.

2. The apparatus as defined in claim 1 in which said torsion spring has a first end connected to said bottom of said housing and a second end connected to said pushbutton, said torsion spring being constructed and arranged to turn said second end thereof about said longitudinal axis while said first end is held fast.

3. The apparatus has defined in claim 2 in which said central bore of said end portion is provided with opposing grooves and in which said pushbutton is provided with opposing, outwardly extending tongues slidably received within said opposing groves formed in said end portion of said grasping member.

4. The apparatus as defined in claim 3 in which said bottom includes an upstanding rim portion and in which said push button further includes a stop ear constructed and arranged to engage said rim portion of said bottom when said pushbutton is in said second position.

5. A grasping apparatus for grasping objects comprising:

(a) a housing comprising interconnected top, bottom and sides defining an internal chamber;

(b) a grasping member connected to said housing for movement between a first stowed position and a second deployed position, said grasping member comprising an end portion and an arm portion having a generally hook-shaped extremity;

(c) deployment means carried by said housing for moving said grasping member from said stowed position to said deployed position, said deployment means comprising a torsion spring having a longitudinal axis, a first end connected to said bottom of said housing and a second end, said torsion spring being constructed and arranged to turn said second end about said longitudinal axis while said first end is held fast by said bottom of said housing; and (d) operating means carried by said housing for operating said deployment means to cause said grasping member to move from said stowed position to said deployed position, said operating means comprising a pushbutton slidably connected to said end portion of said grasping member for movement between a first position and a second position against the urging of said torsion spring.

6. The apparatus as defined in claim 5 in which said second end of said torsion spring is connected to said pushbutton.

7. The apparatus as defined in claim 6 in which said end portion of said grasping member is provided with a central bore having opposing groves and in which said pushbutton is provided with opposing, outwardly extending tongues slidably received within said opposing groves formed in said end portion.

8. The apparatus as defined in claim 7 in which said bottom wall of said housing includes an upstanding rim portion and in which said push button further includes a stop ear constructed and arranged to engage said rim portion of said bottom wall when said pushbutton is in said second position.

9. A grasping apparatus for grasping objects comprising:

(a) a housing having spaced-apart top and bottom walls and first and second sides connected to said spaced-apart top and bottom walls to define an internal chamber, said first side including an elongated chamber;

(b) a grasping member connected to said housing for movement between a first stowed position and a second deployed position, said grasping member comprising an end portion disposed within said internal chamber and an interconnected arm portion disposed within said elongated chamber of said first side, said grasping member having a generally hook-shaped extremity;

(c) deployment means carried by said housing for moving said grasping member from said stowed position to said deployed position, said deployment means comprising a torsion spring carried by said housing, said torsion spring having a longitudinal axis, a first end connected to said bottom wall of said housing and a second end, said torsion spring being constructed and arranged to turn said second end about said longitudinal axis while said first end is held fast by said bottom wall of said housing; and (d) operating means carried by said housing for operating said deployment means to cause said grasping member to move from said stowed position to said deployed position, said operating means comprising a pushbutton connected to said second end of said torsion spring and slidably received within said end portion of said grasping member for movement between a first position and a second position against the urging of said torsion spring.

10. The apparatus as defined in claim 9, further including locking means for releasably locking said gripping member in its deployed position.

11. The apparatus as defined in claim 9 in which said end portion has a central bore having opposing groves and in which said pushbutton is provided with opposing, outwardly extending tongues slidably received within said opposing groves formed in said central bore of said end portion.

12. The apparatus as defined in claim 11 in which said bottom wall of said housing includes an upstanding rim portion and in which said push button further includes a pair of opposing stop ears constructed and arranged to engage said rim portion of said bottom wall when said pushbutton is in said second position.

13. The apparatus as defined in claim 12 in which said second side of said housing includes a longitudinally extending strip constructed from a yieldably deformable elastomer.

14. The apparatus as defined in claim 13 in which said top wall of said housing is provided with an opening and in which said push button extends through said opening.

15. The apparatus as defined in claim 14 in which said housing is generally oval in shape.

* * * * *